(12) United States Patent
Caswell

(10) Patent No.: US 9,447,551 B1
(45) Date of Patent: *Sep. 20, 2016

(54) LASER GUIDE APPARATUS, SYSTEM AND METHOD FOR ASPHALT PAVING EQUIPMENT

(71) Applicant: Buck Wayne Caswell, Elk City, OK (US)

(72) Inventor: Buck Wayne Caswell, Elk City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,507

(22) Filed: Feb. 11, 2016

Related U.S. Application Data

(63) Continuation of application No. 14/541,302, filed on Nov. 14, 2014, now Pat. No. 9,290,891.

(60) Provisional application No. 61/962,980, filed on Nov. 20, 2013.

(51) Int. Cl.
*E01C 19/00* (2006.01)
*G01B 11/27* (2006.01)

(52) U.S. Cl.
CPC ............. *E01C 19/006* (2013.01); *G01B 11/27* (2013.01)

(58) Field of Classification Search
CPC ........ E01C 19/006; E02F 3/847; G01B 11/27
USPC ........................................................ 404/84.5
See application file for complete search history.

(56) References Cited

U.S. PATENT DOCUMENTS

| 3,554,291 | A | 1/1971 | Rogers et al. |
|---|---|---|---|
| 3,617,135 | A | 11/1971 | Betz |
| 3,659,949 | A | 5/1972 | Walsh et al. |
| 3,790,277 | A | 2/1974 | Hogan |
| 3,813,171 | A | 5/1974 | Teach et al. |
| 3,873,226 | A | 3/1975 | Teach |
| 4,820,041 | A | 4/1989 | Davidson et al. |
| 4,830,489 | A | 5/1989 | Cain et al. |
| 4,895,440 | A | 1/1990 | Cain et al. |
| 5,288,167 | A | 2/1994 | Gaffard et al. |
| 5,556,226 | A | 9/1996 | Hohmann, Jr. |
| 6,128,326 | A | 10/2000 | Kousek et al. |
| 7,259,838 | B2 | 8/2007 | Carlhoff et al. |
| 8,591,142 | B2 | 11/2013 | Mittleman |
| 8,794,868 | B2 | 8/2014 | Fritz |
| 2006/0166753 | A1 | 7/2006 | Chan et al. |
| 2007/0059098 | A1 | 3/2007 | Mayfield et al. |
| 2013/0223927 | A1 | 8/2013 | Mings et al. |

*Primary Examiner* — Abigail A Risic
(74) *Attorney, Agent, or Firm* — Martin G. Ozinga; Phillips Murrah PC

(57) ABSTRACT

A new and improved apparatus, system and method for leveling asphalt in road construction that may include at least one laser pointer, at least one alignment target, and at least one visual reference guide attached to a paving machine screed where it is contemplated to project a beam generally parallel with the existing surface to be matched by the newly laid asphalt such that the screed may be adjusted by the beam hitting the screed and the screed moved up and or down accordingly to keep in line with the laser beam that is already positioned in a desired parallel manner.

6 Claims, 4 Drawing Sheets

LASER GUIDE APPARATUS, SYSTEM AND METHOD FOR ASPHALT PAVING EQUIPMENT

CROSS-REFERENCE TO RELATED APPLICATIONS

Priority is claimed from provisional patent application U.S. Ser. No. 61/962,980 filed on Nov. 20, 2013 and incorporated by reference herein.

BACKGROUND OF THE INVENTION

1. Field of the Invention

In general, the present invention relates to road construction. More particularly, the present invention relates to a new and improved system and method for providing a superior level road construction using asphalt and paving machines by utilizing a laser guide system. It is understood that the invention is not limited to a specific road construction utilization.

2. Description of the Prior Art

It is obviously desirable to provide a smooth and level surface in the construction of a road. Furthermore, the Department of Transportation imposes pavement and bridge deck smoothness on many of their projects and may utilize a profilograph to determine the smoothness of the paving on a project. A project is often divided up into 525-foot long segments called extents. By example, under the Oklahoma provision, an unacceptable bump is defined as a vertical deviation greater than 0.60 inches in a 25-foot span.

An unacceptable bump is required to be corrected by grinding until it is within tolerance at no additional charge to the Department. Not only does the contractor have to pay to correct the problem, the Department will also penalize the contractor by means of pay reduction for that extent. Pay reduction can be up to $7,500 per extent. By example, a four-lane highway project that is eight miles long typically has 320 extents. If a maximum penalty is imposed, the pay reduction could be $2,400,000 and further include the costs incurred by the contractor to correct any bumps in excess of the 0.60 inch per 25 foot span. Still furthermore, the Department may pay a bonus for any extent that is exceptionally smooth. This bonus can be up to $1,250 per extent. The example of the same four-lane highway above that is eight miles long could have a maximum bonus of $400,000.

In asphalt road construction, a paving machine and or paver is essentially comprised of three main parts. First is the tractor that propels the machine down the road. Second is the internal machinery that generally accepts the asphalt into a hopper from a separate supply truck and moves it to the rear of the paver via conveyors and augers. The third is the screed that is attached to the towing side arm and pulled behind the paver to smooth and control the thickness of the asphalt being laid. The screed is comprised of a large flat piece of steel plate that has adjustable pitch to control thickness. When in pave mode, there is no mechanical means of raising or lowering the screed to increase or decrease paving thickness. The screed is in a free-floating mode as it is drug across the surface of the asphalt, so the only way to control the thickness of the mat is by increasing or decreasing the pitch of the screed plate.

The screed setting generally determines the level and or plane of the road and the system typically works very well once the paving process is underway, but is known to be difficult to get the screed setting right for the initial takeoff. The term "takeoff" generally refers to the operation of the start of a section to be paved that starts anew from a previous section that has already been paved. By example, to begin each day's new run, the paver is backed up to where the previous day's run had ended and the asphalt stopped. Takeoff boards or spacers are placed on top of the previous day's asphalt and then the screed is set down on top of these spacers. These spacers are essential due to the fact that the new asphalt passing under the screed is not yet compacted. Compaction will occur when a separate machine called a roller passes over the freshly laid asphalt at which time the thickness of the mat of asphalt will decrease.

The spacers must be the proper thickness to allow for the new asphalt to be compacted to the same thickness of the previous days run. Once the screed has been set down on the spacers, the screed operators have to first adjust the screed pitch to make it set flat on these spacers, which is often referred to as "nulling" the screed. The screed pitch is then increased to allow the screed to lay the new asphalt in the exact same plane as the previous day's run.

This is the difficult part. There is no way to gauge how much pitch is needed to achieve the perfect takeoff. There are many variables that determine the amount of pitch required such as mat thickness, type of mix being laid, mix temperature, screed temperature, and mat width are just a few. A reason it is so important to achieve a perfect takeoff is because the penalty of unacceptable bumps and the reward for proper leveling as well as the generally desirable smooth and level construction.

The current method for executing a proper takeoff is to use some sort of measuring device, usually a threaded rod with a nut set at the proper thickness, to poke into the newly laid mat to gauge thickness. Although this gives an accurate measurement, it is measuring behind the screed after the pavement has been laid. By the time it is realized there is a need for a correction, the mat is already out of tolerance and the ride has been compromised.

What is needed is a real time measurement before and during takeoff at the exact point where the material is passing under the screed and connecting to the previously laid asphalt. Of note, the invention is not necessarily directed strictly to asphalt road applications and the used terminology should not be considered limiting the invention to such. Likewise, the current invention is not limited to road applications per se. It is further understood and contemplated that the current invention may be used in association with other applications and utilities.

The current industry is constantly looking for effective, durable, and cost effective construction systems and methods for implementation of same. Thus, there is a need for a new and improved, apparatus, system and method of use as outlined. The current invention provides a solution where the prior art fails.

SUMMARY OF THE INVENTION

In view of the foregoing disadvantages inherent in the known types of road construction and leveling systems associated with screeds now present in the prior art, the present invention provides a convenient, easily used, and reliable system and method. As such, the general purpose of the present invention, which will be described subsequently in greater detail, is to provide a new and improved system and method for guiding and adjusting screeds utilized in asphalt road construction, which has all of the advantages of the prior art and none of the disadvantages.

To attain such, the invention may include a new and improved apparatus, system and method for leveling asphalt in road construction that may include at least one laser pointer, at least one alignment target, and at least one visual reference guide attached to a paving machine screed. It is contemplated to project a beam generally parallel with the existing surface to be matched by the newly laid asphalt such that the screed may be adjusted by the beam hitting the screed and the screed moved up and or down accordingly to keep in line with the laser beam that is already positioned in a desired parallel manner.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved apparatus, system and method for leveling asphalt in road construction during takeoff and the construction process in general.

It is a further object of the present invention to provide a new and improved apparatus, system and method for leveling asphalt in road construction, which is of a durable and reliable construction and may be easily and efficiently applied, manufactured and marketed to the construction industry in general.

An even further object of the present invention is to provide a new and improved apparatus, system and method for leveling asphalt in road construction, which is susceptible to a low cost of application with regard to both equipment and labor, and which accordingly is then susceptible to low prices of sale to the consuming industry, thereby making such invention economically available to those in the industry and public in general.

Still another object of the present invention is to provide a new and improved apparatus, system and method for leveling asphalt in road construction, which provides all of the advantages of the prior art, while simultaneously overcoming some of the disadvantages normally associated therewith.

While still another object of the present invention is to provide a new and improved apparatus, system and method for leveling asphalt in road construction, which allows for exact measurements per industry and transportation rules and regulations.

It is a further object of the present invention to provide a new and improved apparatus, system and method for leveling asphalt in road construction, which eliminates the need for a thickness gauge altogether.

Furthermore, it is a further object of the present invention to provide a new and improved apparatus, system and method for leveling asphalt in road that may utilize existing laser pointers known in the prior art.

Still furthermore, it is a further object of the present invention to provide a new and improved apparatus, system and method for leveling asphalt in road construction, which includes at least one laser pointer, at least one alignment target, and at least one visual reference guide attached to a paving machine screed.

Yet another object of the present invention is to provide a new and improved apparatus, system and method for leveling asphalt in road construction that allows a real time determination of needed screed level during takeoff at the exact point where the material is passing under the screed.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

The present invention referred to throughout may be embodied in other specific forms without departing from its spirit or essential characteristics. The described embodiments are to be considered in all respects only as illustrative and not restrictive. Furthermore, each of the methods that have been described should also be considered only as illustrative and not restrictive.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, exhibits and appendices wherein.

DETAILED DESCRIPTION OF THE PREFERRED EMBODIMENTS

Figure 1:
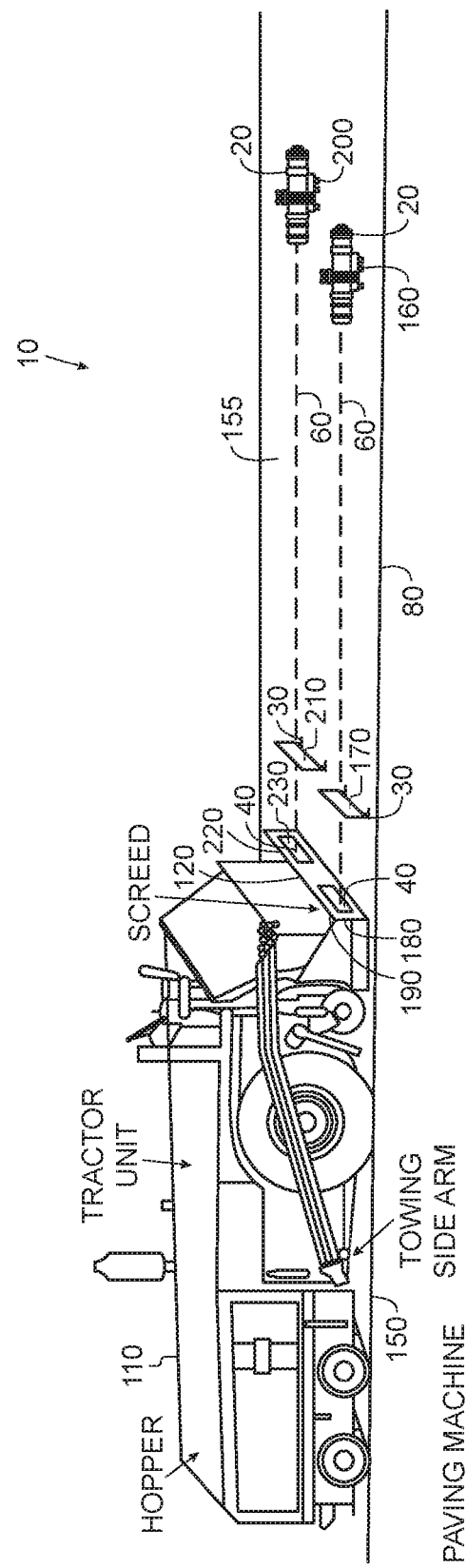
FIG. 1 is a general illustration of a preferred embodiment of the invention.
Figure 2:
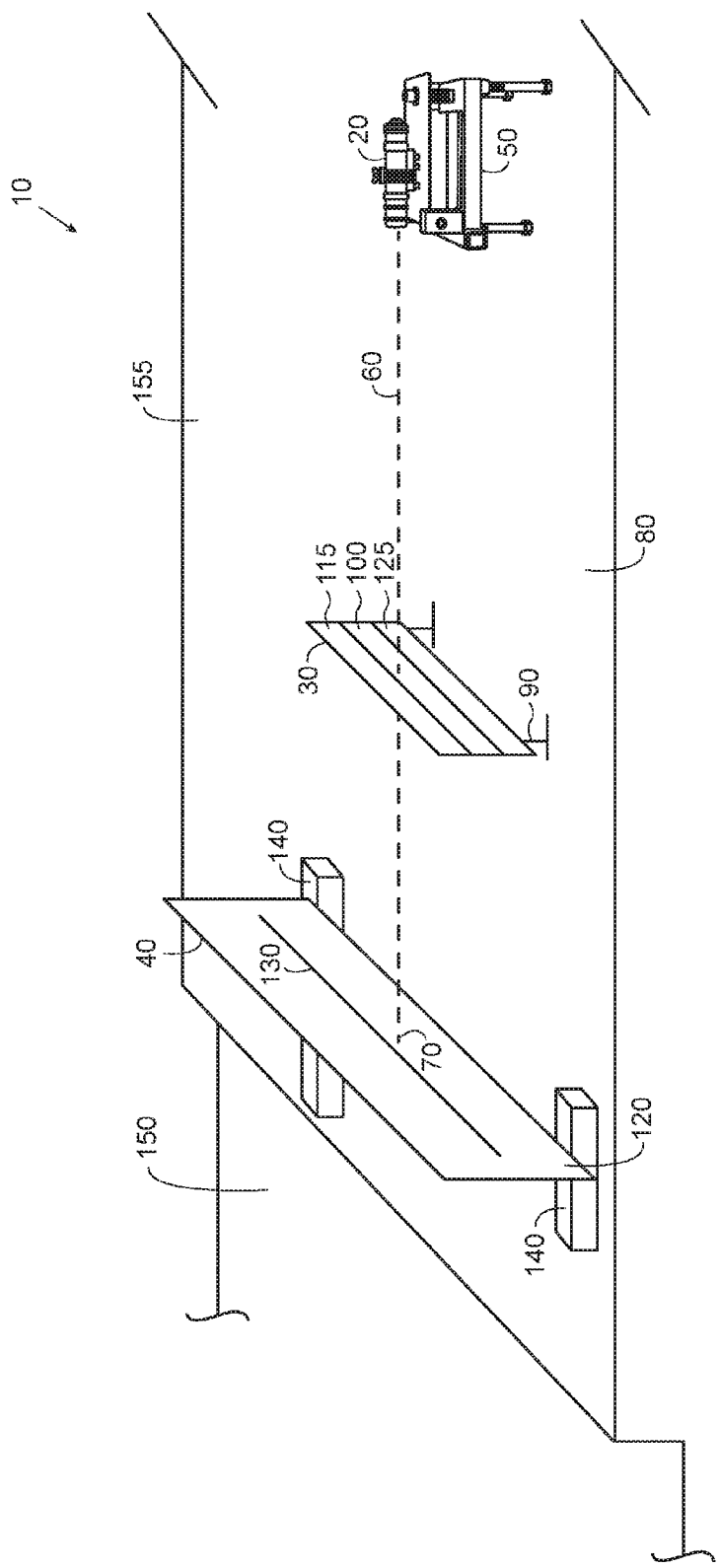
FIG. 2 is a general illustration of a preferred embodiment of the invention.
Figure 3:
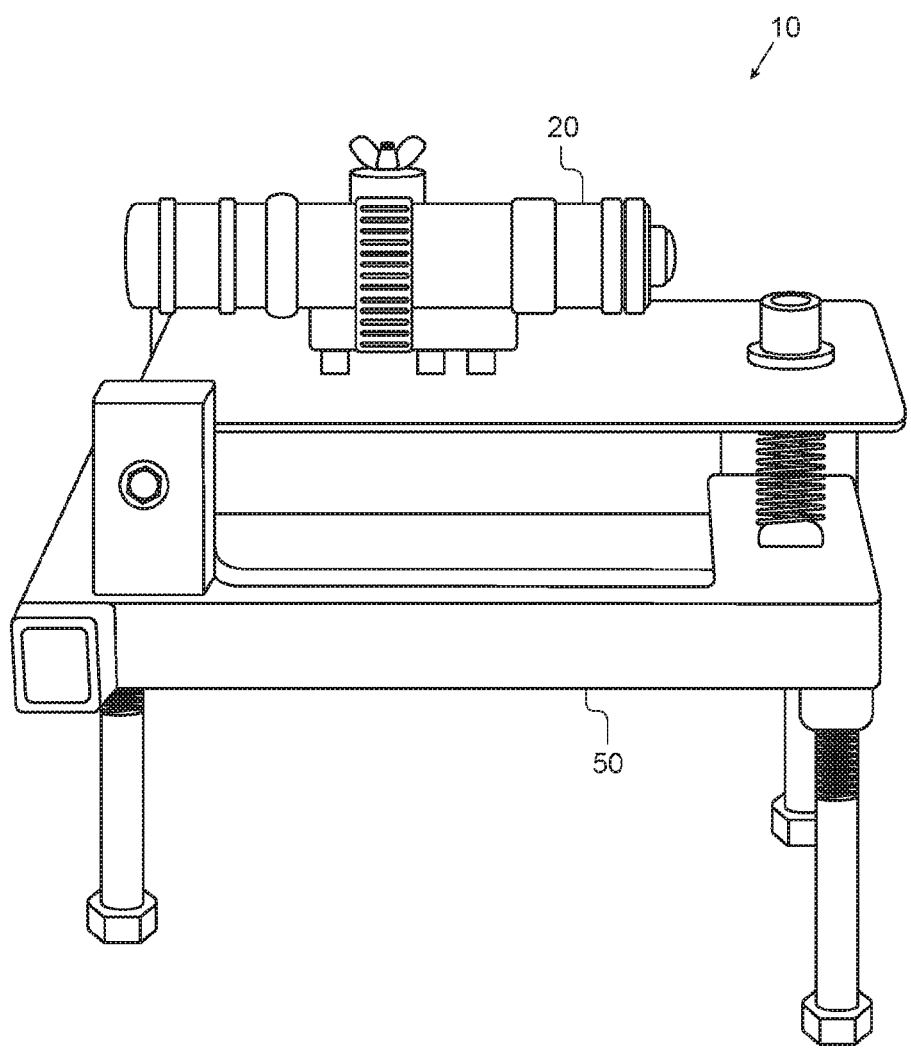
FIG. 3 is a general illustration of a preferred embodiment of the invention depicting a laser pointer system.
Figure 4:
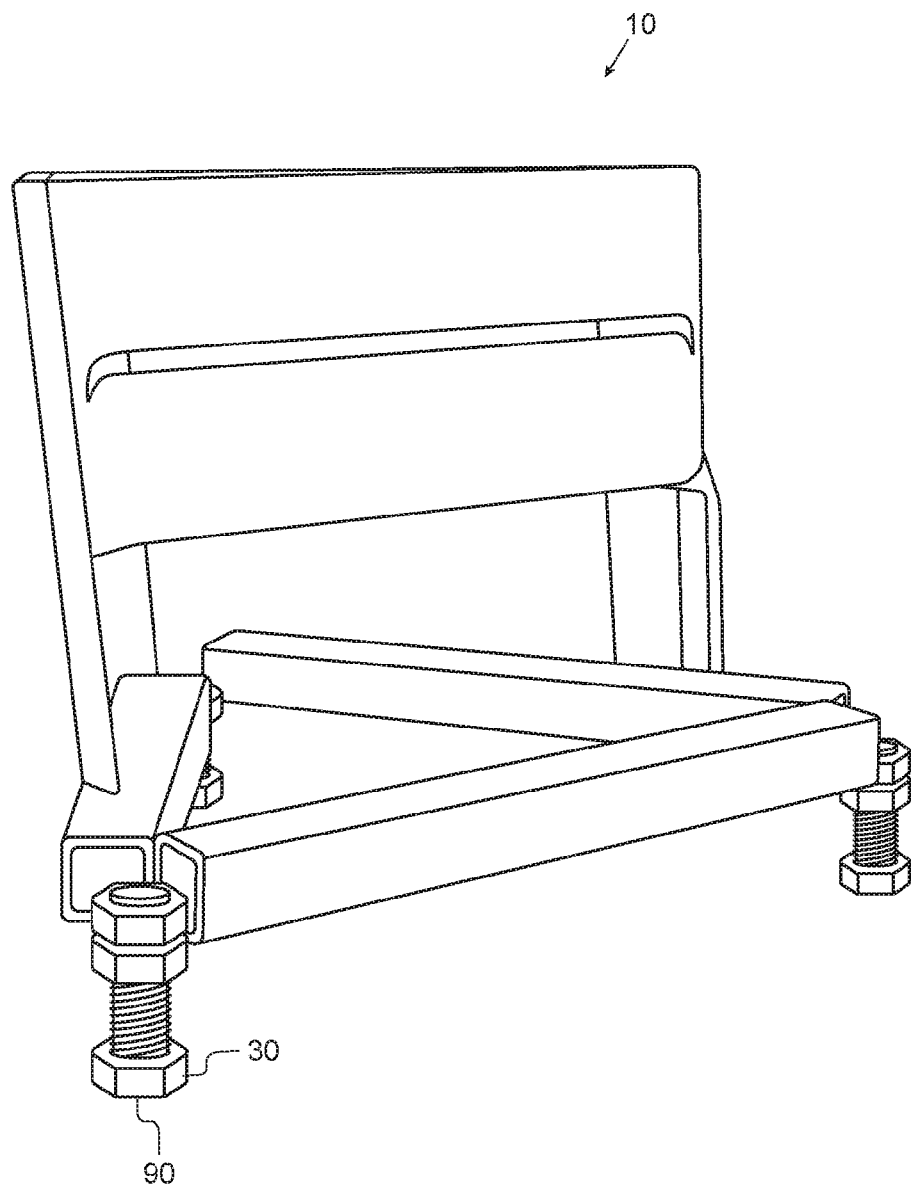
FIG. 4 is a general illustration of a preferred embodiment of the invention depicting laser alignment target system.

The current invention may be classified as a system, method, apparatus and or combinations thereof. The following detailed description does not define any aspect in a particular order of importance but rather attempts to organize the following for convenience only. Referring now to the drawings, wherein like reference numerals designate corresponding structure throughout the views, and referring in particular to the figures, reference numeral 10 generally refers to a new and improved system, method, apparatus and or combinations thereof hereinafter referred to collectively as invention 10 in accordance with a preferred embodiment.

Referring now to the illustration and FIG. 1 in more particular, invention 10 may include at least one laser pointer 20, at least one alignment target 30, and at least one visual reference guide 40. It is understood that invention 10 may utilize one set of laser pointer 20, alignment target 30 and visual reference guide 40 and it is also understood that invention 10 may utilize two or more sets.

Laser Pointer

Laser pointer 20 may be of a construction known in the present prior art and may be of red, green and or other nature. Laser pointer 20 may be removably and or non-removably attached to stand 50. It is understood that adjustable stand and or stand 50 may be of numerous designs, construction materials and so forth. In a preferred construction, stand 50 may be made of metal, have four legs for balance and have a vertical adjustment. It is understood that laser pointer 20 stand 50 may be of fixed height such as but not limited to 6 inches although greater and lesser heights are contemplated. It is also understood that laser pointer 20 general function is to project beam 60 generally horizontal to the surface that it lays upon and that laser pointer 20 beam 60 is positioned as such. Beam 60 can be aimed up or down with a preferred embodiment of center 70 of beam 60 being inches off of ground surface 80. Laser pointer 20 may be battery powered, hard wired powered, combinations thereof and so forth as known in the art.

Alignment Target

The alignment target 30 may have a stand 90, be made of metal, have four legs for balance and or have a vertical adjustment. Alignment target 30 may be stand 90 that has a ⅛" horizontal target, aperture, and or gap 100 between two metal plates 115 and 125 respectively. It is also contemplated that the center of target and or gap 100 is also at 6 inches off the ground although a higher and lower distance is contemplated. In a preferred construction, target and or gap 100 is the same distance from ground surface 80 as the center 70 of beam 60 such that beam 60 may pass though target and or gap 100 and beam 60 is generally parallel with ground surface 80.

Visual Reference Guide

Invention 10 may include visual reference guide 40 with a preferred embodiment being a piece of metal that is attached magnetically and or removably in general to paver 110 screed 120. Guide 40 may be covered in reflective tape and have horizontal target or line 130 printed on it. Visual reference guide 40 may be of multiple configurations, materials, shapes and so forth and generally should allow beam 60 to be shown and or visualized when contacting same. It is contemplated, as discussed further below, that guide 40 is placed on screed 120 after beam 60 is generated and generally hits screed 120. The location on screed 120 that beam 60 hits is generally aligned.

System and/or Method of Use

Paving machine and or paver 110 is generally positioned at the end of the previously deposited asphalt 155 and readied to deposit and or lay new asphalt. Once screed 120 is set down on the takeoff boards and or spacers 140 and the proper amount of pitch dialed into screed 120, the laser pointer 20 is generally placed about 30 feet behind screed 120. Alignment target 30 is then generally placed 5 feet behind screed 120 such that alignment target is generally between laser pointer 20 and screed 120. It is understood that distance from screed 120 of laser pointer 20, screed 120 and alignment target 30, and laser pointer 20 from alignment target 30 may be of greater and lesser distance and the illustrated example should not be considered to limit the invention to just such.

Laser pointer 20 is turned on generating beam 60 and adjusted vertically until beam 60 passes through the center and or gap 100 of alignment target 30. Once this has been done, beam 60 is generally parallel to surface 150 to be now paved behind paver 110. The visual reference guide can now be placed on paver 110 screed 120 so that beam 60 is generally centered on target line 130.

Operator is now prepared to execute the takeoff. As paver 110 moves forward, screed 120 operator(s) adjusts the pitch of screed 120 up or down to keep target line 130 on beam 60. It is understood that some paver(s) 110 may have one or more operators that generally travel behind paver 110 and manually adjust screed 120 as needed and or desired. These operators may be in a position to witness beam 60 on visual reference guide 40 and adjust screed 120 as needed.

It is further contemplated to provide two sets wherein a first 160 laser pointer 20 is utilized with a first 170 alignment target 30 and first 180 visual reference guide 40 on first side 190 of screed 120. A second 200 laser pointer 20 is utilized with a second 210 alignment target 30 and a second 220 visual reference guide 40 on second side 230 of screed 120.

It is contemplated that invention 10 may include another preferred embodiment wherein the laser pointer 20 is mounted on paver 110 wherein the laser alignment target 30 is essentially still utilized on the previously deposited asphalt 155 in the same general configuration as discussed above. It is contemplated to mount visual reference guide 40 where the laser pointer 20 would be located in the above preferred embodiment. Essentially beam 60 would still be in the same general position, but the laser pointer 20 and visual reference guide 40 are switched in position. This may allow paver 110 to automatically adjust screed 120 height via an automated system on board paver 110.

It is further contemplated that paver 110 may utilize an automatic screed 120 adjustment system in either configuration. This may include a hydraulic adjustment on screed 120 that is in cooperation with a system in communication with laser pointer 20 and or visual reference guide 40 as known in the art. It is understood that the adjustment on screed 120 may also be by other means other than hydraulic.

Invention 10 further contemplates that visual reference guide 40 may be replaced with an electronic laser detector which may send an electronic signal to a hydraulic control valve, or other controlling device, to adjust the pitch of screed 120 as necessary to keep screed 120 parallel with the laser beam 60. This may allow for no, little and or reduced manual input from an operator on the pitch of screed 120, and generally allow the paver 110 to make adjustments automatically.

Changes may be made in the combinations, operations and arrangements of the various parts and elements described herein without departing from the spirit and scope of the invention.

I claim:

1. A laser guide system for use with road paving equipment having an adjustable height screed for leveling during takeoff comprising:
   a laser pointer with a laser beam and an adjustable stand;
   a laser alignment target with an adjustable stand and an aperture adapted for allowing said laser beam to pass through said laser alignment target; and
   a visual reference guide removably mounted on said adjustable height screed and having reflective material adapted to visually show said laser beam when said laser beam contacts said visual reference guide for leveling during takeoff.

2. The laser guide system of claim 1 wherein said visual reference guide is magnetically mounted to said screed.

3. The laser guide system of claim 2 wherein said laser alignment target aperture is a gap formed from two parallel spaced apart metal plates.

4. The laser guide system of claim 3 wherein said laser pointer is battery powered.

5. The laser guide system of claim 4 further including:
   a second laser pointer with a second laser beam and a second adjustable stand;
   a second laser alignment target with a second adjustable stand and a second aperture adapted for allowing said second laser beam to pass through said second laser alignment target; and
   a second visual reference guide mounted on said screed adapted to visually show said second laser beam when said second laser beam contacts said second visual reference guide.

6. The laser guide system of claim 1 further including:
   an adjustment controlling device in communication with said adjustable height screed and adapted to adjust said adjustable height screed; and
   a laser detector mounted on said adjustable height screed, in communication with said adjustment controlling device, and adapted to provide input to said an adjustment controlling device for adjusting said adjustable height screed.

* * * * *